United States Patent Office 2,735,856
Patented Feb. 21, 1956

2,735,856

21-HYDROXY-4,17(20)-PREGNADIENE-3,11-DIONE AND ESTERS THEREOF

John A. Hogg, Kalamazoo Township, Kalamazoo County, Philip F. Beal, Portage Township, Kalamazoo County, and Frank H. Lincoln, Jr., Kalamazoo Township, Kalamazoo County, Mich., assignors to The Upjohn Company, Kalamazoo, Mich., a corporation of Michigan No Drawing. Application March 30, 1953,
Serial No. 345,675

4 Claims. (Cl. 260—397.45)

This invention relates to certain pregnadienes and more particularly to 21-hydroxy-4,17(20)-pregnadiene-3,11-dione and 21-hydrocarbon carboxylic acid esters thereof. This application is a continuation-in-part of our copending application Serial No. 307,385, filed August 30, 1952.

It is an object of the present invention to provide the novel 21-hydroxy-4,17(20)-pregnadiene-3,11-dione and 21-lower-acyloxy esters thereof, especially 21-lower-aliphatic hydrocarbon carboxylic acid esters thereof. Other objects will be apparent to those skilled in the art to which this invention pertains.

The novel compounds of the present invention may be represented by the following formula:

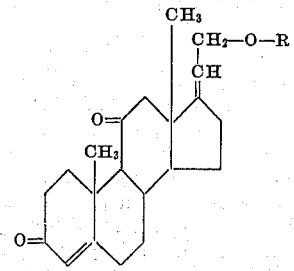

wherein R is a hydrogen atom or the acyl radical of a hydrocarbon carboxylic acid containing from one to eight carbon atoms, inclusive, i. e., 21-hydroxy-4,17(20)-pregnadiene-3,11-dione and 21-lower-acyloxy esters thereof.

21-hydroxy-4,17(20)-pregnadiene-3,11-dione may be prepared by the saponification or hydrolysis of a 21-acyloxy-4,17(20)-pregnadiene-3,11-dione with methanolic, ethanolic, or aqueous sodium hydroxide, potassium hydroxide, sodium carbonate, or the like, dilute hydrochloric acid, sulfuric acid, or the like, at a temperature between about ten degrees centigrade and the boiling point of the reaction mixture, for from a few minutes to several hours to produce 21-hydroxy-4,17(20)-pregnadiene-3,11-dione which may be separated and purified in conventional manner.

A 21-lower-acyloxy-4,17(20)-pregnadiene-3,11-dione may be prepared by oxidation of an 11-hydroxy-21-lower-acyloxy-4,17(20)-pregnadiene-3-one with a suitable oxidation agent such as, for example, the oxidation of 11β-hydroxy-21-acetoxy-4,17(20)-pregnadiene-3-one or other 11-hydroxy-21-lower-acyloxy-4,17(20)-pregnadiene-3-one with chromic acid as illustrated in the examples hereinafter. Preferred among the 21-lower-acyloxy-4,17(20)-pregnadiene-3,11-diones of the present invention is 21-acetoxy-4,17(20)-pregnadiene-3,11-dione. Alternatively, a 21-lower-acyloxy-4,17(20)-pregnadiene-3,11-dione may be prepared by the reaction of 21-hydroxy-4,17(20)-pregnadiene-3,11-dione with formic acid, acetic anhydride in acetic acid, or the like, or with the acid chloride of the selected lower-aliphatic hydrocarbon acid in pyridine, or by other esterification procedures.

21-hydroxy-4,17(20)-pregnadiene-3,11-dione or a 21-lower-aliphatic hydrocarbon carboxylic acid ester thereof is readily convertible to 17α,21-dihydroxy-4-pregnene-3,- 11,20-trione (Kendall's Compound E) by reaction with osmium tetroxide to produce the 17α,20,21-trihydroxy-4-pregnene-3,11-dione osmate ester and subsequent oxidation thereof, as with perchloric acid, salts thereof, or other equivalent oxidizing agents such as hydrogen peroxide, dialkyl peroxides, organic peracids such as peracetic or perbenzoic acid, or the like, in a solvent such as an ether or an alcohol, e. g., tertiary butyl alcohol or diethyl ether, according to procedure already known in the art [Prins and Reichstein, Helv. Chim. Acta, 25, 300 (1942); Ruzicka and Mueller, Helv. Chim. Acta, 22, 755 (1939)].

The compounds of the present invention are novel precursors to the valuable steroid cortisone and provide a less limited supply of precursor steroids for the production of physiologically active steroids than was heretofore available.

The following preparations and examples are illustrative of the products and process of the present invention and the utility of both the products and process of the present invention but are not to be construed as limiting.

PREPARATION 1.—SODIUM ENOLATE OF 11-KETO-21-ETHOXYOXALYLPROGESTERONE

To a mixture of 3.4 milliliters of a 3.4 Normal methanolic sodium methoxide solution, 0.45 milliliters of absolute ethanol, and twenty milliliters of dry benzene, said mixture previously having been distilled until eight milliliters of distillate had been collected and then cooled, was added 2,3 milliliters of ethyl oxalate and a solution of 3.28 grams of 11-ketoprogestrone in 38 milliliters of dry benzene. The solution became turbid and a yellow precipitate formed. The reaction mixture was stirred for ninety minutes, 55 milliliters of ether was then added thereto, and stirring was continued for sixty minutes, whereafter a 130-milliliter portion of ether was added thereto. The thus-formed yellow precipitate of the sodium enolate of 11-keto-21-ethoxyoxalylprogesterone was filtered, washed with several fifty-milliliter portions of ether, and after drying found to weigh 3.65 grams. The ether wash contained 0.54 gram of unreacted 11-ketoprogesterone. The yield of the sodium enolate of 11-keto-21-ethoxyoxalylprogesterone was 81 percent of the theoretical or practically quantitative calculated on the reacted 11-ketoprogesterone.

PREPARATION 2.—3,11-DIKETO-4,17(20)-PREGNADIENE-21-OIC ACID METHYL ESTER

To a stirred solution of 4.50 grams (0.01 mole) of the sodium enolate of 11-keto-21-ethoxyoxalylprogesterone and two grams of potassium acetate in 150 milliliters of methanol was added dropwise 3.09 grams (1.00 milliliter; 0.0193 mole) of bromine. When the addition was complete, 3.24 grams (0.06 mole) of sodium methoxide in forty milliliters of methanol was added thereto, whereafter the whole was maintained at about 25 degrees centigrade for sixteen hours. The reaction mixture was then mixed with a large volume of water and the whole was extracted successively with one portion of benzene and two portions of methylene chloride. The combined extracts were dried over anhydrous sodium sulfate and the solvent then removed therefrom by distillation. The oil was dissolved in fifty milliliters of benzene and chromatographed over a column of 170 grams of Florisil synthetic magnesium silicate. The column was developed with 400-milliliter portions of solvent of the following composition and order: three portions of methylene chloride, five portions of methylene chloride plus five percent acetone, and one portion of acetone. The methylene chloride plus five percent acetone eluates were combined and the solvent was removed therefrom to yield 1.2 grams of 3,11-diketo-4,17(20)-pregnadiene-21-oic acid methyl ester, melting at 155 to 188 degrees centigrade. Crystallization of these crystals from a mixture of acetone plus Skellysolve B hexane hydrocarbons gave crystals melting at 207 to 212 degrees centigrade which after further crystallization melted at 213 to 214 degrees centigrade.

*Analysis.*—Calculated for $C_{22}H_{28}O_4$: C, 74.17; H, 7.92. Found: C, 74.37; H, 8.21.

PREPARATION 3.—3-ETHYLENE GLYCOL KETAL OF 3,11-DIKETO-4,17(20)-PREGNADIENE - 21 - OIC ACID METHYL ESTER

To a solution of 1.5 grams (0.0042 mole) of 3,11-diketo-4,17(20)-pregnadiene-21-oic acid methyl ester dissolved in 150 milliliters of benzene was added 7.5 milliliters of ethylene glycol and 0.150 gram of para-toluenesulfonic acid and the whole was then heated with stirring at the reflux temperature of the reaction mixture for 5.5 hours. The cooled reaction mixture was washed with 100 milliliters of a one percent aqueous sodium bicarbonate solution. The benzene layer was then poured over a column of 150 grams of Florisil synthetic magnesium silicate. The column was developed with 100-milliliter portions of solvents of the following composition and order: eight portions of methylene chloride and three portions of methylene chloride plus four percent acetone. The methylene chloride eluates contained 1.08 grams of the 3-ethylene glycol ketal of 3,11-diketo-4,17(20)-pregnadiene-21-oic acid methyl ester, which upon recrystallization from a mixture of ethyl acetate and Skellysolve B hexane hydrocarbons melted at 188 to 190 degrees centigrade and had the analysis given below. The methylene chloride plus four percent acetone eluates contained 0.390 gram of pure starting 3,11-diketo-4,17(20)-pregnadiene-21-oic acid methyl ester. The yield of product was 87 percent of the theoretical calculated on the amount of starting steroid which reacted.

*Analysis.*—Calculated for $C_{24}H_{32}O_5$: C, 71.94; H, 8.05. Found: C, 71.90; H, 7.95.

PREPARATION 4.—3-ETHYLENE GLYCOL KETAL OF 11β,21-DIHYDROXY-4,17(20)-PREGNADIENE-3-ONE

Eighty milliliters of the supernatant liquid from a solution of one gram of lithium aluminum hydride in 100 milliliters of anhydrous ether was cooled in a flask in an ice-salt bath and one gram of the 3-ethylene glycol ketal of 3,11-diketo-4,17(20)-pregnadiene-21-oic acid methyl ester in fifty milliliters of anhydrous benzene was then added with stirring thereto over a period of ten minutes. The reaction mixture was then decomposed with a saturated aqueous sodium potassium tartrate solution which was cautiously added to the reaction mixture. The solvent layer was then decanted from the resulting mixture and the aqueous layer washed with two fifty-milliliter portions of benzene which was then added to the solvent layer. The combined solvent solutions were dried over anhydrous sodium sulfate and then poured over a column of 75 grams of Florisil synthetc magnesium silicate. The column was developed with 250-milliliter portions of solvents of the following composition and order: four portions of Skellysolve B plus ten percent acetone, six portions of Skellysolve B plus fifteen percent acetone, and finally several portions of Skellysolve B plus 25 percent acetone. The first two Skellysolve B plus ten percent acetone eluates were combined, the solvent distilled therefrom and the 488 milligrams of solids contained therein were crystallized from acetone plus Skellysolve B to yield the 3-ethylene glycol ketal of 11β,21-dihydroxy-4,17(20)-pregnadiene-3-one melting at 183 to 187 degrees centigrade and having an $[\alpha]_D^{23}$ of minus fifteen degrees in acetone.

*Analysis.*—Calculated for $C_{23}H_{34}O_4$: C, 73.76; H, 9.15. Found: C, 73.87; H, 9.22.

PREPARATION 5.—11β,21-DIHYDROXY-4,17(20)-PREGNADIENE-3-ONE

A solution of 0.572 gram (0.0015 mole) of the 3-ethylene glycol ketal of 11β,21-dihydroxy-4,17(20)-pregnadiene-3-one in forty milliliters of acetone was diluted with water to a volume of fifty milliliters and eight drops of concentrated sulfuric acid was then added thereto, whereafter the reaction mixture was kept at room temperature for 24 hours. The reaction mixture was then made alkaline by the addition of a saturated aqueous sodium bicarbonate solution and the acetone was then evaporated from the mixture. Methylene chloride and more water was then added, the methylene chloride layer removed, and the solvent distilled therefrom. The residue, after drying in vacuo, consisted of the theoretical 0.518 gram of 11β,21-dihydroxy-4,17(20)-pregnadiene-3-one.

One crystallization of this product from a mixture of ethyl acetate and Skellysolve B hexane hydrocarbons gave crystals of 11β,21-dihydroxy-4,17(20)-pregnadiene-3-one melting at 156 to 158 degrees centigrade and having an $[\alpha]_D^{23}$ of plus 128 degrees in acetone.

Analysis:
Calculated for $C_{21}H_{30}O_3$ _____ C, 76.32; H, 9.15
Found _____ C, 76.04; H, 9.43
C, 75.83; H, 9.40

PREPARATION 6.—11β-HYDROXY-21-ACETOXY-4,17(20)-PREGNADIENE-3-ONE

A solution of 0.518 gram of 11β,21-dihydroxy-4,17(20)-pregnadiene-3-one in five milliliters of pyridine was mixed with two milliliters of acetic anhydride and the whole was then maintained at room temperature for seventeen hours whereafter crushed ice was added thereto. The precipitated 11β-hydroxy-21-acetoxy-4,17(20)-pregnadiene-3-one was filtered therefrom, dissolved in benzene and then chromatographed over a column of 75 grams of Florisil synthetic magnesium silicate. The column was developed with 75-milliliter portions of solvents of the following composition and order: benzene, three portions each of Skellysolve B hexane hydrocarbons plus one percent acetone, Skellysolve B plus five percent acetone, Skellysolve B plus ten percent acetone, Skellysolve B plus fifteen percent acetone, Skellysolve B plus twenty percent acetone, and finally, two portions of acetone. The eluate fractions containing ten percent and fifteen percent acetone, respectively, were combined, the solvent removed therefrom, and the crystalline residue was crystallized from a mixture of ethyl acetate and Skellysolve B to yield as the first crop 0.253 gram, a yield of 45 percent of the theoretical, of 11β-hydroxy-21-acetoxy-4,17(20)-pregnadiene-3-one melting at 183 to 186 degrees centigrade.

Analysis:
Calculated for $C_{23}H_{32}O_4$ _____ C, 74.16; H, 8.66
Found _____ C, 74.18; H, 8.45
C, 73.95; H, 8.74

Similarly other 21-organic carboxylic acid esters of 11β,21-dihydroxy-4,17(20)-pregnadiene-3-one are prepared wherein the 21-acyloxy group is formyloxy, propionyloxy, butyryloxy, valeryloxy, hexanoyloxy, heptanoyloxy, octanoyloxy, benzoyloxy, phenylacetoxy, or the like, by contacting 11β,21-dihydroxy-4,17(20)-pregnadiene-3-one with an appropriate acylating agent, e. g., the anhydride or acid halide of the selected acid in a solvent such as, for example, benzene, toluene, acetic acid, pyridine, or the like. A convenient method of preparing the 21-formyloxy ester consists in contacting 11β,21-dihydroxy-4,17(20)-pregnadiene-3-one with formic acid in the presence of para-toluenesulfonic acid.

*Example 1.—21-acetoxy-4,17(20)-pregnadiene-3,11-dione*

To a stirred solution of 0.120 gram (0.0004 mole) of 11β - hydroxy - 21 - acetoxy - 4,17(20) - pregnadiene-3-one dissolved in 11.9 milliliters of glacial acetic acid and thereafter cooled to fourteen degrees centigrade was added dropwise, over a period of twenty minutes, a solution of 0.055 gram of chromium trioxide dissolved in 1.1 milliliters of glacial acetic acid and 1.1 milliliters of water. The temperature of the stirred solution was thereafter allowed to rise to eighteen degrees centigrade over a period of one hour. The excess chromium trioxide was destroyed by the addition of an aqueous sodium sulfite solution, and the product then extracted from the reaction mixture with three fifteen-milliliter portions of ether which were thereafter combined, washed with water, and dried over anhydrous sodium sulfate. The ether was then removed by evaporation. The 0.118 gram of residue consisted essentially of 21-acetoxy-4,17(20)-pregnadiene-3,11-dione, which was thereafter purified by chromatographing over a column of ten grams of Florisil synthetic magnesium silicate. The column was developed with forty-milliliter portions of solvents of the following composition and order: benzene, two of Skellysolve B hexane hydrocarbons, five of Skellysolve B plus two percent acetone, five of Skellysolve B plus four percent acetone, five of Skellysolve B plus six percent acetone, three of Skellysolve B plus twenty percent acetone, and finally two of acetone. The Skellysolve B plus twenty percent acetone eluates were freed of solvent and the residues combined and crystallized from two milliliters of Skellysolve B plus ethyl acetate to yield crystals of 21-acetoxy-4,17(20)-pregnadiene-3,11-dione melting at 196 to 199 degrees centigrade and having the analysis given below.

Analysis.—Calculated for $C_{23}H_{30}O_4$: C, 74.50; H, 8.22. Found: C, 74.37; H, 8.34.

Similarly, other 21-organic carboxylic acid esters of 21-hydroxy-4,17(20)-pregnadiene-3,11-dione are prepared wherein the 21-acyloxy group is formyloxy, propionyloxy, butyryloxy, valeryloxy, hexanoyloxy, heptanoyloxy, octanoyloxy, benzoyloxy, phenylacetoxy, or the like, by contacting the selected 11β-hydroxy-21-acyloxy-4,17(20)-pregnadiene-3-one with an oxidizing agent such as, for example, chromic acid in acetic acid or the like.

*Example 2.—21-hydroxy-4,17(20)-pregnadiene 3,11-dione*

To a solution of 26 milligrams of 21-acetoxy-4,17(20)-pregnadiene-3,11-dione in five milliliters of methanol is added 25 milligrams of potassium hydroxide in one milliliter of methanol and the whole maintained at room temperature for sixteen hours. The resulting solution is then acidified with dilute hydrochloric acid and enough water is then added to precipitate the resulting steroid material. There is thus obtained a practically quantitative yield of 21-hydroxy-4,17(20)-pregnadiene-3,11-dione which may be separated by filtering therefrom and purified by crystallization from Skellysolve B plus acetone.

*Example 3.—21-acetoxy-4,17(20)-pregnadiene-3,11-dione*

To a solution of 75 milligrams of 21-hydroxy-4,17(20)-pregnadiene-3,11-dione in five milliliters of glacial acetic acid is added 0.5 milliliter of acetic anhydride and the mixture is allowed to stand at room temperature, protected from atmospheric moisture, for sixteen hours. The mixture is then diluted with fifteen milliliters of water and the resulting precipitate of 21-acetoxy-4,17(20)-pregnadiene-3,11-dione collected by filtration, dried, and thereafter crystallized from a mixture of Skellysolve B plus ethyl acetate to yield crystals of 21-acetoxy-4,17(20)-pregnadiene-3,11-dione melting at 196 to 199 degrees centigrade.

Similarly, other 21-acyloxy-4,17(20)-pregnadiene-3,11-diones are prepared by the reaction in pyridine of 21-hydroxy-4,17(20)-pregnadiene-3,11-dione with the acid chloride of the selected acid, with formic acid, or an acid anhydride, to produce a 21-acyloxy-4,17(20)-pregnadiene-3,11-dione wherein the acyloxy group is formyloxy, acetoxy, propionyloxy, butyryloxy, isobutyryloxy, valeryloxy, hexanoyloxy, heptanoyloxy, octanoyloxy, trimethylacetoxy, β-cyclopentylpropionyloxy, benzoxy, ortho-methylbenzoxy, phenylacetoxy, or the like.

*17α-21-dihydroxy-4-pregnene-3,11,20-trione (Kendall's Compound E)*

To a stirred solution of 0.123 gram (0.00033 mole) of 21-acetoxy-4,17(20)-pregnadiene-3,11-dione in two milliliters of tertiary butyl alcohol is added 0.26 milliliter of a 2.6 molar solution of hydrogen peroxide in tertiary butyl alcohol and 1.00 gram of osmium tetroxide in 100 milliliters of tertiary butyl alcohol. While maintaining the reaction mixture at room temperature for 24 hours, an additional 0.05 milliliter of osmium tetroxide is added, during which time the reaction mixture becomes homogeneous. After 72 hours of maintaining the reaction mixture at room temperature, water is added thereto and the whole then distilled at reduced pressure to free the mixture of organic solvent. The distillation residue is extracted with methylene chloride followed by distillation to remove the methylene chloride. The residue, after dissolving in a mixture of water and methanol, is mixed with 0.50 gram of sodium sulfite and thereafter heated on a steam bath for one-half hour. The 17α,21-dihydroxy-4-pregnene-3,11,20-trione is removed from the cooled solution by extraction with methylene chloride. Subsequent distillation of the methylene chloride is productive of a residue consisting essentially of 17α,21-dihydroxy-4-pregnene-3,11,20-trione (Kendall's Compound E). Fractional crystallization separates a small amount of 17α-hydroxy-21-acetoxy-4-pregnene-3,11,20-trione present therein.

In a like manner, 17α,21-dihydroxy-4-pregnene-3,11,20-trione is prepared by contacting other esters of 21-hydroxy-4,17(20)-pregnadiene-3,11-dione, especially the esters described in Examples 1 and 3, with osmium tetroxide and hydrogen peroxide, perchloric acid, or other perhalo acid, or salt thereof, peracetic acid, perbenzoic acid, or the like, in tertiary butyl alcohol, ethyl ether, or other suitable solvent, followed by reaction with aqueous sodium sulfite.

Similarly, the reaction of 21-hydroxy-4,17(20)-pregnadiene-3,11-dione with osmium tetroxide and hydrogen peroxide according to the method described above is productive of 17α,21-dihydroxy-4-pregnene-3,11,20-trione (Kendall's Compound E).

It is to be understood that the invention is not to be limited to the exact details of operation or exact compounds shown and described, as obvious modifications and equivalents will be apparent to one skilled in the art, and the invention is therefore to be limited only by the scope of the appended claims.

We claim:

1. A compound represented by the following formula:

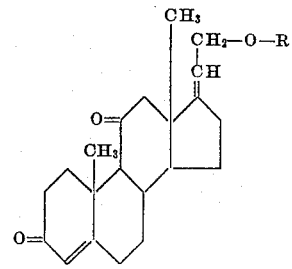

wherein R is selected from the group consisting of a hydrogen atom and acyl radicals of hydrocarbon carboxylic acids containing from one to eight carbon atoms, inclusive.

2. A 21-acyloxy-4,17(20)-pregnadiene-3,11-dione wherein the acyl radical is the acyl radical of a hydrocarbon carboxylic acid containing from one to eight carbon atoms, inclusive.

3. 21-acetoxy-4,17(20)-pregnadiene-3,11-dione.

4. 21-hydroxy-4,17(20)-pregnadiene-3,11-dione.

References Cited in the file of this patent

UNITED STATES PATENTS

| | | |
|---|---|---|
| 2,492,194 | Sarett | Dec. 27, 1949 |
| 2,510,940 | Sarett | June 13, 1950 |